United States Patent [19]

Fridlyand

[11] 4,317,984

[45] Mar. 2, 1982

[54] METHOD OF PLASMA TREATMENT OF MATERIALS

[76] Inventor: Mikhail G. Fridlyand, ulitsa Pestelya, 11, kv. 139, Leningrad, U.S.S.R.

[21] Appl. No.: 55,743

[22] Filed: Jul. 9, 1979

[30] Foreign Application Priority Data

Jul. 7, 1978 [SU] U.S.S.R. ............................... 2630652
Feb. 21, 1979 [SU] U.S.S.R. ............................... 2721822

[51] Int. Cl.³ ............................................. B23K 9/00
[52] U.S. Cl. ........................ 219/121 PU; 219/121 PY;
       219/121 PW; 219/75; 219/137 R
[58] Field of Search ................. 219/121 R, 121 P, 74,
       219/75, 76.16, 137 R, 121 PW, 121 PJ, 121 PP,
       121 PT, 121 PU, 121 PY; 313/231.3, 231.4,
       231.5; 13/2 P

[56] References Cited

U.S. PATENT DOCUMENTS

| | | | |
|---|---|---|---|
| 2,952,706 | 9/1960 | Lipscomb | 219/75 X |
| 3,246,115 | 4/1966 | Johnson | 219/75 X |
| 3,307,011 | 2/1967 | Baird | 219/75 X |
| 3,671,655 | 6/1972 | Adachi et al. | 219/121 P |
| 3,828,162 | 8/1974 | Holder | 219/75 |
| 4,141,694 | 2/1979 | Camacho | 219/121 P |

FOREIGN PATENT DOCUMENTS 1206531 12/1965 Fed. Rep. of Germany ... 219/121 P
1101279  1/1968 United Kingdom ............ 219/121 P Primary Examiner—Gene Z. Rubinson
Assistant Examiner—M. Paschall
Attorney, Agent, or Firm—McAulay, Fields, Fisher, Goldstein & Nissen

[57] ABSTRACT

Disclosed is a method of plasma treatment of materials comprising introducing a plasma-forming mixture including carbon-containing compounds chosen from the class of hydrocarbons or carbon monoxide into the space between the electrodes of an electric arc device to provide deposition of carbon at least on one of the electrodes of an electric arc device in the course of arc burning, striking an electric arc, and introducing an oxidizing agent into said space between the electrodes to improve the stability of arc burning, the oxidizing agent being introduced into said space between the electrodes over a time interval between the instant when a heat flow into the electrode whereon carbon is deposited reaches its maximum value and the instant when said heat flow drops down to a steady value.

15 Claims, 5 Drawing Figures

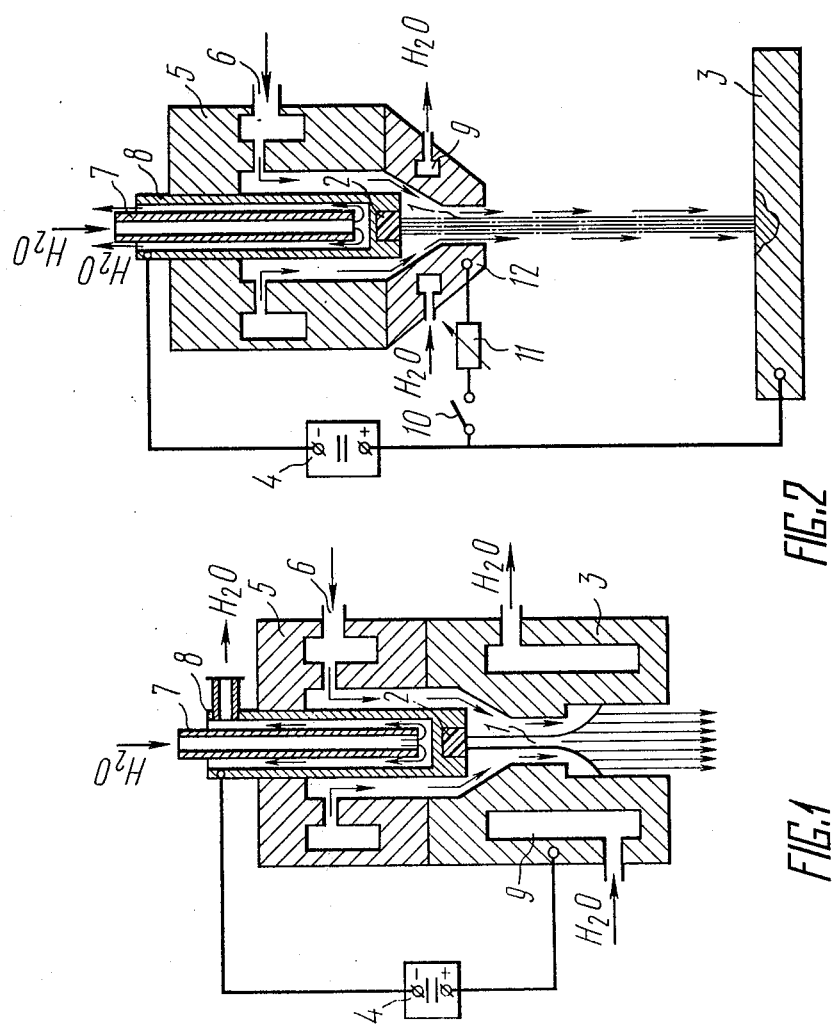

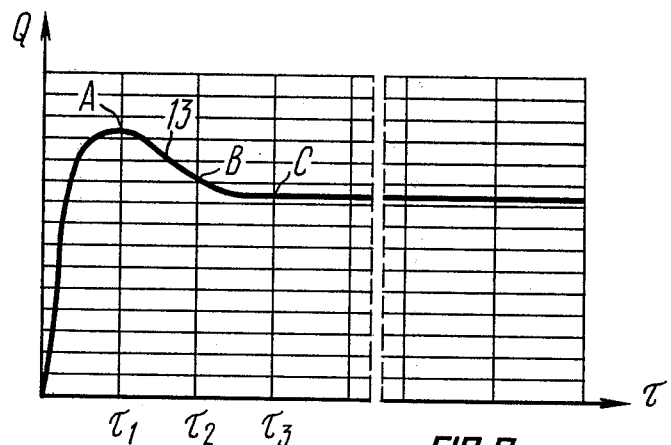
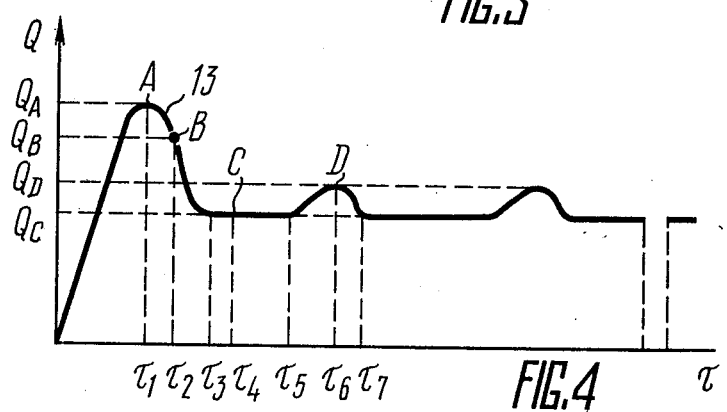

METHOD OF PLASMA TREATMENT OF MATERIALS

FIELD OF THE INVENTION

The present invention relates to the art of electric arc treatment of materials, and more particularly to a method of plasma treatment of materials.

The present invention can be used most advantageously in ore melting and remelting, cutting and welding of metals, applying of coatings.

BACKGROUND OF THE INVENTION

In order that a method of plasma treatment of materials should be utilized in metallurgy and could successfully compete with a conventional pyrometallurgical method of treatment of materials, a number of conditions must be fulfilled. Specifically, among these are the following:

1. Employment of plasma-forming mixtures composed of inexpensive and non-scarce gases capable of chemical reactions with treated materials, primarily those containing carbon and hydrogen and providing reducing reactions in melts.

2. Achievement of a long and reliable operating life of all the elements of respective electric arc devices, primarily the most thermally stressed ones, such as electrodes, at currents of not less than 500 amperes and at an power of a few hundreds of kilowatts.

Known in the prior art is a method of plasma treatment of materials, consisting in that introduced into the space between the electrodes of an electric arc device is a plasma-forming gas such as carbon dioxide (cf. British Pat. No. 874,970).

This method enables plasma treatment of materials to be conducted only in an oxidizing atmosphere since only carbon dioxide is used as a plasma-forming gas.

Besides, it is impossible to provide with this method a long and reliable operating life of electrodes at currents over 175 amperes and at a power above 10 kilowatts.

The operating life of electrodes can be extended by introducing carbon into a plasma-forming atmosphere.

Known in the art is a method of plasma treatment of materials (cf. British Pat. No. 1,101,279), consisting in introduction of carbon rods into the space between the electrodes of an electric arc device, with burning-off of which rods, a plasma-forming atmosphere being enriched with carbon which is further deposited on one or both electrodes.

In spite of the fact that this method makes it possible to extend the operating life of electrodes, it requires complex equipment as it needs additional power sources and mechanisms for feeding carbon rods into the space between the electrodes.

The operating life of the electrodes of an electric arc device can be extended in a simpler way, such as by introducing carbon-containing compounds into the plasma-forming atmosphere.

This is based on a well-known phenomenon of dissociation and pyrolysis of carbon-containing compounds at high temperatures of an electric arc with an accompanying evolution of free carbon.

Known in the art is a method of plasma treatment of materials (cf. RFG Pat. No. 1,206,531), consisting in that, introduced into the space between the electrodes of an electric arc device is a plasma-forming mixture composed of hydrogen with addition of hydrocarbons, the ratio between the number of atoms of carbon and that of hydrogen in the plasma-forming mixture being from 1:6 to 1:25, and the plasma-forming mixture is further supplied into an arc burning zone in the hollow cathode, the ratio between the operating voltage in volts and the operating current (in amperes) being from 5 to 15.

This method makes it possible to extend the operating life of the cathode from 30 seconds up to 100 hours at a current of 100 amperes and at an arc power of 100 kilowatts due to deposition of a carbon ring on the operating surface of the hollow cathode during arc burning, whereon a cathode drop region of an electric arc is directly located.

However, application of this method is limited since the composition of a plasma-forming mixture can include only hydrogen and hydrocarbons.

Besides, this method is unusable in a number of processes, such as welding, cutting, melting of electrically conductive materials, which require localization of electrode drop regions, one of them being located on a treated material.

Lastly, in this method, an arc current cannot exceed the value of the order of 100 amperes, while to provide stable striking and burning of an electric arc a power source with a voltage drop of not less than 1,000 volts is required, which certainly limits wide industrial application of this method.

Also known in the art is a method of plasma treatment of materials (cf. U.S. Pat. No. 3,246,115), consisting in that introduced into the space between the electrodes of an electric arc device is a plasma-forming mixture including a fuel gas (carbon-containing compounds) and an oxidizing agent.

This method can be employed only for gas-flame treatment of materials.

This is explained by the fact that the main energy release takes place, as with a conventional gas torch, on chemical burning-up of fuel carbon-containing gases in an oxidizing agent, these gases being supplied through the gas torch as a mixture. The electric arc burning between the tip of this gas torch and the nozzle of an electric arc device serves only to stabilize this burning and raise the temperature of combustion products.

Burning of carbon-containing compounds in an oxidizing agent, with a considerable excess of the latter, eliminates deposition of carbon on the electrodes of an electric arc device.

Known in the art is a method of plasma treatment of materials (cf. U.S. Pat. No. 3,307,011), consisting in that introduced into the space between the electrodes of an electric arc device is a plasma-forming mixture including carbon-containing compounds chosen from the class of hydrocarbons or carbon monoxide, which provide deposition of carbon at least on one of the electrodes of an electric arc device in the course of arc burning, and gases inert to the material of the electrodes.

Used as gases inert to particular materials are, for example, argon and helium when the electrode is made of carbon, copper and aluminium, or nitrogen and air when an electrode is made of copper.

This method makes it possible to reduce the erosion of electrodes and thus to extend their operating life with stable striking and burning of the arc at currents from 400 to 1,000 amperes.

However, this method does not provide operation of the electrodes under conditions of their constant restoration on retention of their parameters unchanged, i.e. does not provide equilibrium between the amount of carbon depositing on the operating surface and that of carbon carried away from this surface.

When realizing this method, the weight of the electrodes either constantly decreases (they are eroded), or constantly grows (they increase in size). In the first case the electrode is ultimately destroyed, and in the second one localization of a cathode drop region on the operating surface of the electrode is eliminated, which disturbs stable burning of the electric arc.

The aforementioned phenomenon can be explained by the following reasons firstly, the use of only the gases inert to the material of electrodes along with carbon-containing compounds in the composition of a plasma-forming mixture; secondly, the lack of quantitative relationship between the arc current and the flow rate of carbon-containing compounds depending on the composition of a plasma-forming mixture; and thirdly, the lack of relationship between the variation in the composition of a plasma-forming mixture and the time of arc burning.

Besides, this method does not provide high quality of plasma-arc welding, cutting and similar processes of treatment of electrically conductive materials due to the fact that, to realize this method, it is necessary to employ electric arc devices with the electrodes made either hollow (of copper) or lump (of carbon), which eliminates the possibility of localization of the arc column or plasma jet in the zone of treatment.

SUMMARY OF THE INVENTION

It is an object of the present invention to provide a method of plasma treatment of materials, which makes it possible to achieve a long and reliable operating life of the electrodes of an electric arc device with stable arc burning.

Another an object of the present invention is to expand the field of application of this method.

Still another object of the present invention is to provide protection of the environment from pollution by the off-gases of chemical-metallurgical production.

Still another object of the present invention is to improve the quality of treatment of materials.

A further object of the present invention is to provide constant restoration of the electrodes from a plasma-forming mixture.

A still further object of the present invention is to establish a quantitative relationship between the arc current and the flow rate of carbon-containing compounds.

A still further object of the present invention is to define the relationship between the time of variation of the qualitative composition of a plasma-forming mixture and the time of arc burning.

With these and other objects in view there is provided a method of plasma treatment of materials, comprising introducing into the space between the electrodes of an electric arc device a plasma-forming mixture including carbon-containing compounds chosen from the class of hydrocarbons or carbon monoxide to provide carbon deposition at least on one of the electrodes of an electric arc device in the course of arc burning, striking an electric arc, and introducing an oxidizing agent into said space between the electrodes to improve the stability of arc burning, wherein according to the invention introduction of the oxidizing agent is performed over a time interval between the instant when a heat flow into the electrode whereon carbon is deposited reaches its maximum value and the instant when said heat flow decreases down to a steady value.

Introduction of an oxidizing agent into the space between the electrodes over a certain time interval determined from a heat flow into one of the electrodes ensures the operation of the electrodes under conditions of constant restoration, carbon being deposited thereon in the course of arc burning.

The operating surface (the emitting one in case of a cathode) is formed of carbon after a heat flow into the electrode has passed its maximum whereby a film of said operating surface is formed by a film of carbon deposited from a plasma-forming mixture. Just from this time on an oxidizing agent can be fed into a plasma-forming atmosphere without the danger of electrode destruction.

Thus, when an oxidizing agent is introduced into the space between the electrodes over a time interval between the instant when a heat flow into one of the electrodes, primarily into the cathode, whereon carbon is being deposited reaches its maximum value and the instant when said heat flow decreases to a steady value, the dimensions of the electrode remain constant throughout the time of plasma treatment, which provides high stability of arc burning with theoretically unlimited operating life of the electrode.

When determining the time interval of introduction of an oxidizing agent, a cathode is preferred due to the fact that deposition of carbon on the operating surface of the cathode starts practically simultaneously with arc striking, whereas deposition of carbon on the operating surface of the anode starts dozens of seconds later. This is true for a DC arc. In case of an AC arc, all the electrodes from the viewpoint of carbon deposition are in equal conditions, since each electrode in accordance with current commutation serves alternately as the cathode and the anode.

Introduction of an oxidizing agent into the space between the electrodes, before a heat flow into the electrode reaches its maximum value, results in intensive erosion of the electrode. This derives from the fact that until this instant a carbon film protecting the operating surface agent direct contact with an oxidizing agent does not still cover all this surface.

Introduction of an oxidizing agent into the space between the electrodes after a heat flow into the electrode has decreased to its steady value is inexpedient.

This derives from the fact that, from this time on, an excessive carbon is deposited around the periphery of the operating surface of the electrode, covered with a carbon film, and when the dimensions of a carbon formation grow, the mobility of the electrode drop region of the arc increases, thus decreasing the stability of electrical and geometrical characteristics of the electric arc.

This in turn, on the one hand, affects the quality of treatment of materials, particularly of a dimensional one (such as welding, cutting, and weld depositing), and on the other hand, may cause arc extinction.

When an oxidizing agent is introduced into the space between the electrodes in the form of oxygen or air, it is advisable to supply it in the amount from 0.4 to 0.9 by volume of that corresponding to theoretically complete conversion of hydrocarbons.

After a heat flow into the electrode has reached its steady value, it is advisable to introduce an oxidizing agent in the form of oxygen or air into the space between the electrodes in the amount less than 0.4 by volume of the corresponding to theoretically complete conversion of hydrocarbons.

When an oxidizing agent is introduced into the space between the electrodes in the form of carbon dioxide, it is advisable to supply it in the amount from 1.05 to 2.5 times by volume more than that corresponding to theoretically complete conversion of hydrocarbons.

After a heat flow into the electrode has reached its steady value, it is advisable to introduce an oxidizing agent in the form of carbon dioxide into the space between the electrodes in the amount less than 1.05 by volume of that corresponding to theoretically complete conversion of hydrocarbons.

Going out beyond these limits over a time interval corresponding to the reduction of a heat flow into the electrode from a maximum value to a steady one disturbs the equilibrium between the deposition and carry-away of carbon at the operating surface of the electrode.

The operating zone of the electrode, formed by depositing carbon, is either intensively destroyed as a result of shortage of carbon in case the amount of an oxidizing agent by volume exceeds the upper limit of said ranges, or starts to grow in its size in case the amount of an oxidizing agent by volume decreases below the lower limit of this range.

After a heat flow into the electrode has reached its steady value, the amount of an oxidizing agent in a plasma-forming mixture may be reduced below the value of 0.4 by volume of the amount corresponding to theoretically complete conversion of hydrocarbons when oxygen or air are employed as the oxidizing agent, or below the value of 1.05 by volume of the amount corresponding to theoretically complete conversion of hydrocarbons when carbon dioxide is employed as the oxidizing agent.

In so doing, the enlargement of the operating zone of the electrode, accompanied by the growth of a heat flow therein, is prevented by a repeated short-time increase in the oxidizing agent content of a plasma-forming mixture up to a value of 0.4 to 0.9 by volume (it an oxidizing agent is oxygen or carbon) or 1.05 to 2.5 by volume (if an oxidizing agent is carbon dioxide) of the amount corresponding to theoretically complete conversion of hydrocarbons in the mixture, a heat flow into the electrode being increased by 10 to 15 percent above the steady value corresponding to the arc current, all other things being equal.

As the process is conducted in this way, plasma treatment can be performed in cases when a gaseous atmosphere in the zone of treatment should be as reducing as possible, i.e. should contain a maximum quantity of hydrocarbons and the products of their pyrolysis as, for example, in reducing melting of metals.

According to the chemical affinity of an oxidizing agent for a carbon-containing compound, it is advisable to introduce the latter into the space between the electrodes in the amount ranging from $(0.5 \times 10^{-3})/n$ liters per ampere-second (l/amp-sec) to $(6 \times 10^{-3})/n$ l/amp-sec, where "n" is the number of atoms of carbon in the employed carbon-containing compound.

With a less chemical affinity characterized by a free energy of formation of respective products of reactions of carbon-containing compounds and/or of carbon with an oxidizing agent, carbon-containing compounds are introduced in the amount close to the lower limit, i.e. to $(0.5 \times 10^{-3})/n$ l/amp-sec, and with a greater chemical affinity, this amount approximates the upper limit, i.e. to $(6 \times 10^{-3})/n$ l/amp-sec.

Introduction of carbon-containing compounds into the space between the electrodes in the amount from $(0.5 \times 10^{-3})/n$ l/amp-sec to $(6 \times 10^{-3})/n$ l/amp-sec makes it possible to provide operation of the electrode under conditions of its constant restoration.

When carbon-containing compounds are introduced in the amount less than $(0.5 \times 10^{-3})/n$ l/amp-sec, the electrode will be destroyed since the amount of carbon depositing on the electrode is insufficient to provide constant restoration of this electrode.

When carbon-containing compounds are introduced in the amount more than $(6 \times 10^{-3})/n$ l/amp-sec, the dimensions of the electrode will grow without limits, which will cause disturbance of the stability of arc burning, as well as degradation of the quality of treatment of materials by means of this arc.

It is advisable to introduce an oxidizing agent and a plasma-forming mixture including carbon-containing compounds into the space between the electrodes of an electric arc device separately, carbon-containing compounds being introduced directly into the zone contacting the operating surface of one of the electrodes, preferably cathode.

Separate introduction of an oxidizing agent and carbon-containing compounds into an electric arc device enables the operating conditions of each electrode to be controlled separately, which is of particular importance for treatment of materials with a plasma jet when all the electrodes of an electric arc device are exposed to varying potentials (in case of a DC are to the potential of a cathode and anode) and due to this operate in different conditions.

Foregoing and other objects and advantages of the present invention will become more apparent upon consideration of the following detailed description of its embodiments taken in conjunction with the accompanying drawings in which:

BRIEF DESCRIPTION OF THE ACCOMPANYING DRAWINGS

FIG. 1 shows a longitudinal section of a device illustrating a method of plasma treatment of materials, preferably electrically non-conductive ones, by means of a plasma jet formed in the course of arc burning between the electrodes of an electric arc device, according to the invention;

FIG. 2 shows a longitudinal section of a device illustrating the embodiment of a method of plasma treatment of materials, preferably electrically conductive ones, by means of an electric arc when a treated material serves as one of the electrodes, according to the invention;

FIG. 3 shows a curve of the amount of a heat flow into the electrode versus the time of arc burning, according to the invention;

FIG. 4 shows a curve of the amount of heat flow into the electrode versus the time of arc burning, illustrating another embodiment of a method of plasma treatment of materials, according to the invention.

Figure 5:
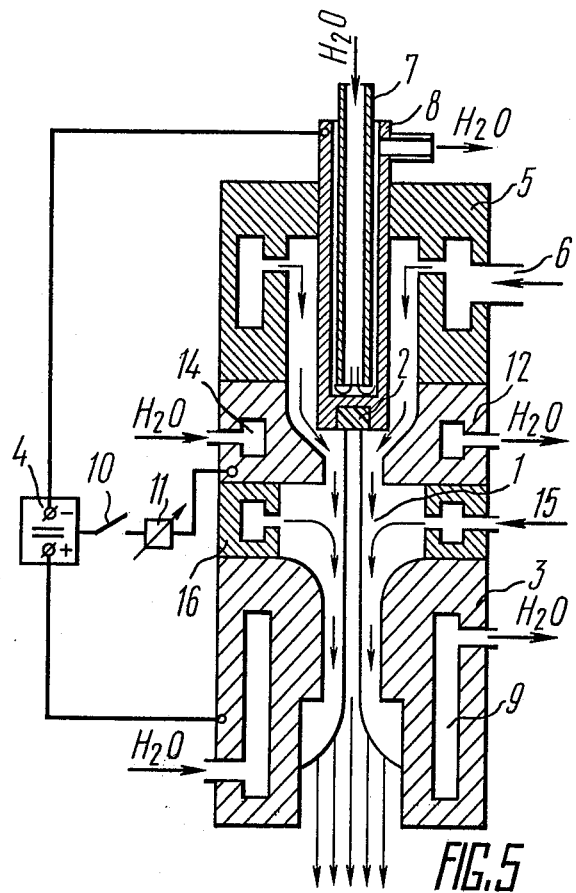
FIG. 5 shows a longitudinal section of a device illustrating another embodiment of a method of plasma treatment of materials, according to the invention.

The experimental studies have shown that a heat flow into the electrode varies quite differently depending on whether a plasma-forming mixture includes carbon-containing compounds whose decomposition in an electric arc causes evolution of carbon depositing on the electrodes of an electric arc device.

In the absence of these compounds, a heat flow into the electrode having reached a particular value on arc striking further grows steadily, an arc current being unchanged, with a rate of growth depending on the composition of a plasma-forming mixture, material and geometrical dimensions of the electrode, which results from electrode erosion. This phenomenon shows up most vividly in the cathode of an electric arc device.

A minimum increase in a heat flow into the cathode with time and hence a minimum erosion thereof, is observed in tungsten cathodes in an inert gas atmosphere, such as argon. But the growth of a heat flow into the cathode and cathode erosion increase sharply, thus reaching disastrous values for the same tungsten cathode in chemically active gases, such as oxygen or air.

In the presence of carbon-containing compounds chosen from the classes of hydrocarbons and carbon monoxide, formed in a plasma-forming mixture in the course of arc burning along with other components thereof is free carbon as a result of decomposition (pyrolysis and dissociation) of these compounds according to the following reactions;

$$C_nH_{2n+2} \rightarrow nC + (n+1)H_2 \quad (1)$$

$$2CO \rightarrow CO_2 + C \quad (2)$$

$$CO \rightarrow C + O \quad (3)$$

Decomposition (pyrolysis) of hydrocarbons, particularly of paraffin ones according to Formula 1, proceeds with minor consumption of energy (for example, for methane $CH_4 \simeq 17$ kilocalories per mole), and therefore decomposition is complete at rather low temperatures (for methane $\sim 1,200°$ C.).

Decomposition (dissociation) of carbon monoxide according to Formula 2 also proceeds at moderate temperatures, which is indicated by the fact that both the equilibrium constant $K_p = (P_{co2}/P_{co})$ (4) of this reaction, where $K_p$ is the equilibrium constant and $P_{CO2}$, $P_{CO}$ are partial pressures of carbon dioxide and carbon monoxide, respectively, in a plasma-forming mixture, and the logarithm of this constant equal to 1 $g(P_{co2}/P_{co}) = (8.916/T) - 9.113$ (5) where T is the temperature of a gas mixture, sharply fall with a rise in temperature.

Decomposition (dissociation) of carbon monoxide according to Formula (3) proceeds in the range of high temperatures as indicated by a high order increase of an equilibrium constant in this range, the constant being $K_p \times (P_c \times P_o)/P_{co}$ (6), where $P_c$, $P_o$, $P_{co}$ are partial pressures of carbon, elemental oxygen, and carbon monoxide, respectively, in a plasma-forming mixture.

Variations of the equilibrium constant with temperature for Formula 3 are given in Table 1.

Since the operating portion of the electrode (the emitting surface for the cathode) is being covered with a layer of carbon, a heat flow into the electrode, having reached on arc striking a maximum value defined by the arc current, starts to decrease. It is just this fact that distinguishes an electric arc whose plasma-forming mixture contains carbon capable of depositing on the electrodes from an electric arc with a plasma-forming mixture which does not contain such a carbon.

Reduction of a heat flow continues until all the operating surface of the electrode is covered with carbon. With continued arc burning, a heat flow into the electrode, having reached a particular steady value also dependent on the arc current, does not further vary with time until the operating surface of the electrode, formed by carbon having deposited thereon from a plasma-forming mixture, grows to such an extent that a heat flow again begins to increase.

Thus, in case of the cathode, around the periphery of its operating (emitting) surface formed by the carbon deposited from a plasma-forming mixture and representing a real cathode of an electric arc device a carbon formation in the form of a crown arises, growing in size. As this formation grows, the mobility of the cathode drop region of the electric arc increases This results in the disturbance of localization of this region and in the increase in a heat flow into the cathode.

The arc becomes unstable and ultimately is extinguished.

As a rule, this is preceded by the increase of a heat flow into the cathode by approximately 15 percent as compared to the steady value of a heat flow determined by the arc current, all other things being equal.

The author has also found that it is advisable to introduce an oxidizing agent not immediately upon striking the area but when a heat flow into the electrode, having reached its maximum value, decreases by 10 percent of this maximum value.

When choosing a relation for a plasma-forming mixture between hydrocarbons and an oxidizing agent in the form of oxygen or air, or between hydrocarbons and an oxidizing agent in the form of carbon dioxide, the author proceeded from the following factors.

Firstly, so that carbon could be available in its free form providing constant restoration of the electrode, a plasma-forming mixture in the zone of its contact with the electrode whereon carbon is deposited should have some shortage in the oxidizing agent. Such mixtures can be obtained most easily from the conversion of hydrocarbons by oxidizing agents.

For example, the conversion of paraffin hydrocarbons by different oxidizing agents proceeds according to the following reactions:

$$C_nH_{2n+2} + (n_{o_2}/2) = nCO + (n+1)H_2 \quad (7)$$

$$C_nH_{2n+2} + nCO_2 = 2nCO + (n+1)H_2 \quad (8)$$

TABLE 1

| Temperature °K. | 3,000 | 4,000 | 5,000 | 6,000 | 7,000 | 8,000 | 9,000 | 10,000 | 12,000 |
|---|---|---|---|---|---|---|---|---|---|
| lg $K_p$ | −11.62 | −6.85 | −3.97 | −2.04 | −0.65 | 0.40 | 1.22 | 1.88 | 2.87 |
| $K_p$ | 2.376 × 10$^{-12}$ | 1.075 × 10$^{-4}$ | 1.415 × 10$^{-7}$ | 9.192 × 10$^{-3}$ | 2.25 × 10$^{-1}$ 2.511 | 16.57 | 75.5 | 738.6 |

A free carbon is deposited from a plasma-forming mixture on the electrodes of an electric arc device, carbon getting on the cathode primarily as positive ions.

$$C_nH_{2n+2} + nH_2O = nCO + (2n+1)H_2 \quad (9)$$

With some shortage of an oxidizing agent as compared with its volumetric flow rate which is required for theoretically complete conversion of hydrocarbons of the mixture which flow rate is taken as a unity, the conversion reaction will not proceed completely, and present in the mixture along with CO and $H_2$ will be carbon essential for constant restoration of the electrodes.

Secondly, it is well known to those skilled in the art that in every inhomogeneous gas mixture found in the volume, caused by the action of centrifugal forces and temperature gradients is mechanical and thermodiffusive separation of the mixture components. In so doing, gases are separated according to their molecular weights: the periphery and cooler zones of the volume are enriched with heavier gases, and the centre and more heated zones are enriched with lighter gases.

In every electric arc, with considerable temperature gradients sharply increasing when it is stabilized in an electric arc device chemical inhomogeneity of a plasma forming mixture is observed both over its cross-section and along the length of an electric arc. Gases with greater molecular weights are expelled to the perhiphery of the electric arc and those with smaller molecular weights are expelled toward its axis, which provides different conditions of operation of the arc column and its electrode drop regions.

In mixtures with hydrocarbons the molecular weights of oxygen, air, and carbon dioxide, utilized as oxidizing agents, are greater than that of carbon whose molecular weight is equal to 12. Thus, the molecular weights of air, oxygen, and carbon dioxide are 29, 32, and 44, respectively.

According to the relations between the molecular weights of a particular oxidizing agent and carbon, an oxidizing agent is expelled to the periphery of the arc column, and the central portion of the column is enriched in carbon.

The rate of such separation grows with the increase in the arc current and in the rate of feeding of a plasma-forming mixture into the space between the electrodes of an electric arc device due to the increase in temperature gradients and pressures in the gas volume bounded by an electrode gap.

When lighter oxidizing agents, such as oxygen or air, are used, their amount in a plasma-forming mixture lies in the range from 0.4 to 0.9 by volume of that required for theoretically complete conversion of hydrocarbons of a mixture, this amount shifting toward the upper limit with the increase in the arc current and in the flow rate (rate of feeding) of a plasma-forming mixture into the space between the electrodes.

When a heavier oxidizing agent, such as carbon dioxide, is used, its amount in the mixture should be from 1.05 to 2.5 times by volume more than that corresponding to theoretically complete conversion of hydrocarbons of the mixture, this amount also shifting toward the upper limit with the increase in the arc current and in the flow rate of a plasma-forming mixture.

Experimental studies has shown that in a number of cases, even when the relations between the amounts of carbon-containing compounds and an oxidizing agent are fulfulled, constant restoration of the electrode is not observed. This occurred regardless of the arc current at low (less than $0.5 \times 10^{-3}$)/n 1/amp-sec) flow rates of carbon-containing compounds when the electrode was being destroyed, and at high (more than $(6 \times 10^{-3})$/n 1/amp-sec) flow rates thereof when the dimensions of the operating zone of the electrode were growing without limit and the stability of arc burning was disturbed.

To explain this phenomenon, the author followed the known fact that carbon deposition on the cathode in a DC arc continues constantly and on the electrode in an AC arc occurs alternately, during the periods when its serves as a cathode, in the form of positive ions and obeys Faraday's second law for electrolysis.

In accordance with this law, the amount G of the carbon deposited on the electrode is proportional to a chemical equivalent $A=12$ of a single ionized monoatomic carbon, current I, and current passing time $\tau$ i.e. $G=(12/F) \, I\tau$ (10), where F is a Faraday constant equal to $9.65 \times 10^4$ coulombs per gramme-equivalent.

Substituting the value of F into Formula 10 gives the following:

$$G = \frac{12}{9.65 \times 10^4} I\tau = 1.243 \times 10^{-4} \times I\tau \text{g/amp-sec} \qquad (11)$$

This made it possible to relate the flow rate of a carbon-containing compound which is the source of carbon providing an ion current to the electrode, to the arc current, and knowing the amount of carbon in this compound, to determine its flow rate theoretically required for a specified current to pass.

In practice, however, the flow rate of carbon-containing compounds, as the experiments has shown, differs from theoretically calculated one and also depends on the chemical nature of an oxidizing agent introduced into a plasma forming mixture.

This is explained by the fact that a portion of a carbon-containing compounds and/or free carbon, when entering into reactions with an oxidizing agent contained in a plasma-forming mixture, form chemical compounds (CO, $C_2H_2$, $CO_2$, CN, HCN, $C_2N_2$ and so on) and hence cannot be deposited on the electrode and form a real carbon electrode.

It is well known to those skilled in the art that in mixtures composed of chemically interacting components the possibility of formation of particular reaction products is defined by an isobar-isothermal potential (Gibbs function) or by a chemical affinity of these components.

In the plasma-forming mixture under consideration, both carbon-containing compounds (CO, $CH_4$ and other hydrocarbons) introduced therein, and free carbon C are capable of chemical reaction with an oxidizing agent also introduced into this mixture.

Thermodynamic calculations performed by means of known methods have shown that chemical affinity of both carbon-containing compounds and carbon tends to decrease with the transition from $O_2$ to $CO_2$. From this theoretic premise and experimental studies it was concluded that, to provide the amount of free carbon in a plasma-forming mixture, corresponding to the flow of a specified current, the flow rate of a carbon-containing mixture which ensures operation of the electrode in conditions of constant restoration, should lie in the range from $(0.5 \times 10^{-3})$/n 1/amp-sec to $(6 \times 10^{-3})$/n 1/amp-sec, where "n" is the number of atoms of carbon in the molecular of the respective carbon-containing compound.

With the use of an oxidizing agent with a less chemical affinity for a carbon-containing compound and/or carbon, as well as with the increase of the role of factors causing more intensive separation of the mixture components according to their molecular weights (increase in the arc current, rise in the rate of introduction of a plasma-forming mixture into the space between the electrodes of an electric arc device), the flow rate of carbon-containing compounds is taken closer to the lower limit of said range, and with the opposite conditions, it is taken closer to the upper limit thereof.

A method of plasma treatment of materials is explained by a device shown in FIG. 1.

The space 1 between a face-ended cathode 2 and a hollow anode 3 of an electric arc device connected to a DC power supply 4 is filled through a bushing 5 with a plasma-forming mixture 6 including carbon-containing compounds in the form of hydrocarbons and/or carbon monoxide. An arc is struck between the face-ended cathode 2 and the hollow anode 3. A cooling liquid is fed into a tube 7 disposed inside a cathode holder 8 and into the cooling chamber 9 of the anode 3.

Thereupon, variation of a heat flow into the face-ended cathode 2 with time is observed. This observation is performed, for example, according to the value of a thermal e.m.f. proportional to the temperature difference of the cooling liquid at its outlet from the interior of the cathode holder 8 and at its inlet to the tube 7. The temperature difference is followed by means of a differential thermocouple previously calibrated. Said thermal e.m.f. is registered either visually according to the readings of a millivoltmeter or by means of a recording potentiometer with records made on a record chart.

After a heat flow into the face-ended cathode 2 having reached its maximum value, starts to decrease and decreases approximately by 10 percent of this maximum value, but prior to the instant when it drops to a steady value, an oxidizing agent is introduced into the space 1 between the face-ended cathode 2 and the hollow anode 3.

Introduction of an oxidizing agent, i.e. the substance chemically active to carbon, along with a carbon-containing compound into the space 1 between the face-ended cathode 2 and the hollow anode 3 enables an excess of carbon to form volatile compounds. This in turn provides constancy of the dimensions of the real carbon electrode being formed, and operation thereof in conditions of constant restoration when the process of carbon depositing on the cathode 2 from the plasma-forming mixture 6 is equilibrated by the processes of carry-away and evaporation of carbon in the form of compounds with an oxidizing agent.

When a heat flow into the face-ended cathode 2 is registered according to variations in the thermal e.m.f. of a differential thermocouple, introduction of an oxidizing agent into the space 1 between the face-ended cathode 2 and the hollow anode 3 may be automated by feeding a signal from a thermocouple through the system of automatics to actuators provided in gas lines.

When realizing this method of plasma treatment of materials by means of a device shown in FIG. 2, to stabilize an electric arc, connected to the power supply 4 through a contactor 10 and a resistor 11 is a nozzle 12. The resistor 11 limits the current for the period of arc striking.

A treated material serves as the anode 3.

Realization of the method of plasma treatment of materials by means of this device provides constant restoration from a plasma-forming mixture of only the face-ended cathode 2 disposed inside the electric arc device.

If the electric arc device in FIGS. 1 and 2 is connected to the AC power supply 4, the electrodes will restore primarily when they serve as cathodes.

A curve 13 shown in FIG. 3 represents a heat flow into the electrode versus the time of arc burning, the ordinate being a heat flow Q into the electrode, in kilowatts, and the abscissa being the time $\tau$ or arc burning, in seconds.

As shows the curve 13, at an instant $\tau_1$ upon arc striking a heat flow into the electrode reaches its maximum value, a point "A" on the curve 13 corresponding to this value. Then a heat flow into the electrode begins to decrease, and at an instant $\tau_2$ its value reduces approximately by 10 percent of the maximum value of a heat flow into the electrode, a point "B" on the curve 13 corresponding to this value. At an instant $\tau_3$ a heat flow into the electrode drops to a steady value corresponding to a point "C".

An oxidizing agent is introduced into the space 1 between the face-ended cathode 2 and the hollow anode 3 during the time interval from $\tau_1$ to $\tau_3$.

If oxygen or air is used as an oxidizing agent, it is introduced into the space 1 between the face-ended cathode 2 and the hollow anode 3 over the time interval from $\tau_1$ to $\tau_3$ in the amount from 0.4 to 0.9 by volume of that corresponding to theoretically complete conversion of hydrocarbons.

If carbon dioxide is used as an oxidizing agent, it is introduced into the space 1 between the face-ended cathode 2 and the hollow anode 3 over the time interval from $\tau_1$ to $\tau_3$ in the amount from 1.05 to 2.5 times by volume more than that corresponding to theoretically complete conversion of hydrocarbons.

The method of plasma treatment of materials may be further realized according to two versions.

If the amount of an oxidizing agent is maintained within the aforementioned limits, starting from the instant $\tau_3$, a heat flow into the face-ended cathode 2, having reduced to a steady value corresponding to the arc current, all other things being equal, does not further vary throughout the time of arc burning.

If according to processing requirements the process of plasma treatment starting from an instant $\tau_4$ (FIG. 4) should be conducted with lower amounts of an oxidizing agent than those mentioned above, then starting from the instant $\tau_4$ an oxidizing agent is introduced into the space 1 between the face-ended cathode 2 and the hollow anode 3 in the amount less than 0.4 of that required for theoretically complete conversion of hydrocarbons in the mixture with the use of oxygen or air as an oxidizing agent, or in the amount less than 1.05 of that required for theoretically complete conversion of hydrocarbons in the mixture where carbon dioxide is used as an oxidizing agent.

Starting from an instant $\tau_5$, the growth of the dimensions of the carbon cathode begins again, which is accompanied by the increase of a heat flow thereinto.

The time interval from $\tau_4$ to $\tau_5$ corresponding to normal operation of the cathode 2 with a reduced flow rate of an oxidizing agent depends all other things being equal, on the degree of reduction of the oxidizing agent flow rate and becomes minimum if an oxidizing agent is excluded from the composition of a plasma-forming mixture.

By an instant $\tau_6$, the value of a heat flow into the cathode 2, corresponding to a point "D" on the curve 13, exceeds the steady value of a heat flow into the cathode 2, corresponding to the point "C", as mentioned hereinabove, by 10 to 15 percent.

At this instant the amount of an oxidizing agent in a plasma-forming mixture is again increased up to the amount which was fed over the time interval from $\tau_1$ to $\tau_3$ and is maintained at this level until at an instant $\tau_7$ to heat flow into the cathode 2 again drops to the steady value, and then the amount of an oxidizing agent in a plasma-forming mixture is anew reduced to the value determined by the requirements of the process.

The process of variation of the amount of an oxidizing agent in a plasma-forming mixture is further conducted in the same way, i.e. periodically throughout the time of plasma treatment.

Thus, it is made possible to conduct plasma treatment of materials over the greater part of time in a gaseous atmosphere with a high reducing power, yet not disturbing the conditions of constant restoration of the cathode.

The rise in the amount of the oxidizing agent before a heat flow into the cathode is increased less than by 10 percent is irrational, since it results in the decrease in the total time of treatment in a gaseous atmosphere having an increased reducing potential, whereas the variations in the cathode geometry corresponding to such a rise of a heat flow are not dangerous from the viewpoint of the stability of arc burning and quality of treatment.

The rise in the amount of the oxidizing agent after a heat flow into the cathode 2 has increased by 15 percent as compared to the steady value is undesirable since the geometrical dimensions of the cathode 2 therewith grow to an extent that causes a considerable increase in the time interval from $\tau_6$ to $\tau_7$ over which the parameters characterizing the state of the cathode 2, i.e. its dimensions and a heat flow therein to, regain their initial steady values.

Variation of the amount of an oxidizing agent may be automated by connecting the thermocouples registering variations in the temperature of the water cooling the cathode 2, i.e. variations in a heat flow into the cathode 2 with a constant flow rate of water, to an actuator in the supply lines of the oxidizing agent.

The possibility of periodic variation of the composition of the plasma-forming mixture of hydrocarbons and an oxidizing agent, contacting the operating surface of the cathode, was found by the author experimentally.

A plasmatron with a restoring cathode was employed in plasma-arc melting of the charge of calcium carbide with carbon in a graphite crucible by a DC arc, a treated material serving as the anode thereof. Using as a plasma-forming mixture providing constant restoration of the cathode was a natural gas mixed with air, whose amount by volume constituted 0.45 percent of that corresponding to theoretically complete conversion of the natural gas of the mixture. An oxidizing agent was introduced into the space between the electrodes at the instant when a heat flow into the cathode reached its maximum, and the flow rate of an oxidizing agent in initial experiments was maintained constant at the aforementioned level.

However, the study of the material melted under this conditions showed that, to improve its quality, a reducing potential in the gaseous atmosphere of the arc in the zone of treatment should be increased, which could be achieved only by the reduction in the flow rate of an oxidizing agent down to its complete elimination. The attempts to reduce the flow rate of an oxidizing agent to a minimum or to eliminate it completely for the whole period of melting process failed because of the increase in the dimensions of a carbon formation serving as a real carbon cathode and due to phenomena caused thereby, such as the increase in mobility of the cathode drop region, disturbance of the arc stability, variation of its geometric dimensions and thermophysical characteristics, as a result of which either the extinction of the arc or drastic degradation of the quality of treatment occurred, i.e. the known disadvantages of cathode operation in hydrocarbons without an oxidizing agent were thus confirmed.

Hence, there was made an attempt to conduct the whole process of melting under periodic conditions: over a major period of time the arc was burning with minimum oxidizing agent content, and periodically at the instants of heat flow rise a plasma-forming mixture was enriched with air in the amount corresponding to normal operation of the cathode in conditions of constant restoration, i.e. from 0.4 to 0.9 by volume of the amount required for theoretically complete conversion of a natural gas. The time intervals $\tau_6 \ldots \tau_7$ over which a natural gas and air in said ratio served as a plasma-forming mixture did not exceed 60 seconds, whereas the time intervals of arc burning with minimum oxidizing agent content were from 200 to 300 seconds.

A plurality of experiments revealed the optimum value of the excess of a heat flow into the cathode over the steady value, corresponding to the instant of the increase of the oxidizing agent amount, ranging from 10 to 15 percent.

The experiments has shown that periodic variation of the amount of an oxidizing agent in a plasma-forming mixture is possible with burning of the arc not only with an outlying anode, but also in treatment of materials with a plasma jet, i.e. with a nozzle anode of a plasmatron, particularly when the cathode and the anode of a plasmatron are separated by an intermediate nozzle and it is possible to provide separate feeding of plasma-forming gases into the cathode and anode drop regions of the arc.

EXAMPLE 1

An electric arc of 400 amperes is struck in an electric arc device between the face-ended copper cathode pressed into a water-cooled cathode holder and the hollow water-cooled anode in a plasma-forming mixture containing methane. The water cooling the cathode is passed through a differential thermocouple previously calibrated by means of thermostats, a "cold" thermojunction of this thermocouple being soldered to the tube wherethrough the water enters the cathode and its "hot" thermojunction being soldered to the tube wherethrough the water leaves the cathode.

A thermal e.m.f. proportional to the temperature difference of the water in these tubes is supplied to an electronic recording potentiometer, and a constant record of the thermal e.m.f. is performed with a speed of 1,800 mm/sec.

The flow rate of the water cooling the cathode is maintained constant and equal to 200 grammes per second. The value of a heat flow into the cathode is determined according to the values of the temperature difference and water flow rate at every instant.

Twenty seconds after arc striking a heat flow into the cathode reaches its maximum value equal to 4.0 kilowatts, whereupon it starts to drop. With the reduction of a heat flow down to 3.4 kilowatts, i.e. 15 percent below the maximum value, which occurs 45 seconds after arc striking, an oxidizing agent, namely carbon dioxide, is introduced into the space between the copper cathode and the hollow anode.

The electric arc further exhibits stable burning, with the cathode operating in conditions of constant restoration.

EXAMPLE 2

Everything is the same as in Example 1, but an oxidizing agent is introduced into the space between the cathode and the hollow anode 10 seconds after arc striking, i.e. before the instant when a heat flow reaches its maximum value of 4.0 kilowatts. In this case, an active erosion of the operating zone of the electrode begins.

EXAMPLE 3

Everything is the same as in Example 1, but an oxidizing agent, that is carbon dioxide, is introduced into the space between the copper cathode and the hollow anode 180 seconds after a heat flow into the cathode has reached its steady value equal to 2.8 kilowatts, which occurred 90 seconds after arc striking.

Even at the time the electric arc is burning unstably with fluctuations in the voltage, temperature, and dimensions of a plasma jet, and introduction of an oxidizing agent brings the arc back to the conditions of stable burning after a long period of time equal to 120 sec over which the quality of plasma treatment of a material was adversely affected.

EXAMPLE 4

A plasma-forming mixture containing methane $CH_4$ is introduced with a flow rate of 2,800 liters per hour (1/hr) into the space between the cathode in the form of graphite rod pressed into a water-cooled copper cathode holder disposed in an electric arc device also comprising a water-cooled copper nozzle and a bath of molten metal serving as an outlying anode.

A DC arc of 600 amperes is struck between the cathode and the anode.

After a heat flow into the cathode has reached its maximum value, intoduced into the space between the electrodes is an oxidizing agent, that is oxygen, with a flow rate of 630 1/hr which corresponds to 0.45 of the amount of oxygen required for theoretically complete conversion of methane having a flow rate of 2.800 1/hr, calculated from Formula 7.

After the electric arc, with said composition of a plasma forming mixture, has attained the conditions of stable burning with a steady value of a heat flow into the cathode equal to 1.3 kw, the flow rate of oxygen is reduced down to 315 1/hr which corresponds to 0.22 of the amount required for theoretically complete conversion of methane having a flow rate of 2.800 1/hr.

These conditions are maintained up to the moment when a heat flow into the cathode increases by 15 percent of the steady value, i.e. up to 1.5 kw, whereupon the flow rate of oxygen is again increased up to 630 1/hr for a period of time until a heat flow into the cathode again drops down to 1.3 kw.

Said operations are periodically repeated, which makes it possible to conduct melting of metal over a greater part of time in a gaseous atmosphere with a high reducing power.

EXAMPLE 5

A plasma-forming mixture containing methane $CH_4$ is introduced with a flow rate of 4,000 1/hr into the space between the cathode of rod graphite pressed into a water-cooled copper cathode holder disposed in an electric arc device also comprising a water-cooled copper nozzle and a bath of molten metal serving as the outlying anode.

A DC arc of 500 amperes is struck between the cathode and the anode.

After a heat flow into the cathode has reached its maximum value, introduced into the space between the cathode and the anode is an oxidizing agent, that is air, with a flow rate of 6,500 1/hr which corresponds to 0.68 of the amount of air required for theoretically complete conversion of methane having a flow rate of 4,00 1/hr, calculated from Formula considering that oxygen content of air is equal to 0.21.

EXAMPLE 6

A plasma-forming mixture containing a natural gas including not less than 90 percent of methane $CH_4$ is introduced with a flow rate of 7,200 1/hr between the cathode in the form of graphite rod pressed into a water-cooled copper cathode holder disposed in an electric arc device also comprising a water-cooled copper nozzle and a bath of molten metal serving as the outlying anode.

A DC arc of 500 amperes is struck between the cathode and the anode.

After a heat flow into the cathode has reached its maximum value, introduced into the space between the cathode and the anode is an oxidizing agent, that is air, with a flow rate of 14,600 1/hr which corresponds to 0.85 of the amount of air required for theoretically complete conversion of said amount of natural gas, calculated from Formula 7, considering that oxygen content of air is equal to 0.21.

EXAMPLE 7

A plasma-forming mixture containing methane $CH_4$ is introduced with a flow rate of 3,000 1/hr into an electric arc device between the cathode of rod graphite pressed into a water-cooled copper cathode holder and the hollow water-cooled copper anode.

A DC arc of 500 amperes is struck between the cathode and the anode.

After a heat flow into the cathode has reached its maximum value, introduced into the space between the cathode and the anode is an oxidizing agent, that is carbon dioxide, with a flow rate of 3,300 1/hr, i.e. 1.1 times by volume over that required for theoretically complete conversion of said amount of methane calculated from Formula 8.

After arc burning has been stabilized, with a steady value of a heat flow into the cathode being equal to 1.1 kw, the flow rate of carbon dioxide is reduced down to 1,600 1/hr which corresponds to 0.53 by volume of that required for theoretically complete conversion of methane having a flow rate of 3,000 1/hr.

With this composition of a plasma-forming mixture, operation is continued until a heat flow into the cathode grows up to 1.25 kw, i.e. by 14 percent over the steady value. Thereupon, the flow rate of carbon dioxide is anew increased up to 3,300 1/hr, and this composition of a plasma-forming mixture is maintained until a heat flow into the cathode again reduces down to the steady value of 1.1 kw.

The process of variation of the composition of a plasma-forming mixture is further periodically repeated throughout the whole treatment making it possible to obtain in this case a highly reducing atmosphere in the zone of treatment.

EXAMPLE 8

A plasma-forming mixture containing methane $CH_4$ is introduced with a flow rate of 4,200 l/hr into an electric arc device between the cathode of rod graphite pressed into a water-cooled copper cathode holder and the hollow water-cooled copper anode.

A DC arc of 650 amperes is struck between the cathode and the anode.

After a heat flow into the cathode has reached its maximum value, introduced into the space between the cathode and the anode is an oxidizing agent, that is carbon dioxide, with a flow rate of 7,560 l/hr, i.e. 1.8 times by volume over that required for theoretically complete conversion of said amount of methane calculated from Formula 8.

EXAMPLE 9

A plasma forming mixture containing natural gas composed primarily of methane $CH_4$ is introduced with a flow rate of 6,200 l/hr into an electric arc device between the cathode of rod graphite pressed into a water-cooled copper cathode holder and the hollow water-cooled copper anode.

A DC arc of 850 amperes is struck between the cathode and the anode.

After a heat flow into the cathode has reached its maximum value, introduced into the space between the cathode and the anode is an oxidizing agent, that is carbon dioxide, with a flow rate of 14,900 l/hr which is by volume 2.4 times over the amount of carbon dioxide required for theoretically complete conversion of said amount of a natural gas, calculated from Formula 8.

EXAMPLE 10

A plasma-forming mixture containing carbon monoxide CO (n=1) is introduced with a flow rate of 1,080 l/hr that corresponds to a second flow rate of carbon monoxide, reduced to an arc current of 500 amperes and equal to $0.6 \times 10^{-3}$ l/amp-sec, into an electric arc device into the space between the cathode of rod graphite pressed into a water-cooled copper cathode holder and the hollow water-cooled copper anode.

A DC arc of 500 amperes is struck between the cathode and the anode.

After a heat flow into the cathode has reached its maximum value, introduced into the space between the cathode and the anode is an oxidizing agent, that is carbon dioxide, having a flow rate of 1,200 l/hr.

Low content of carbon monoxide CO in the plasma-forming mixture is possible due to small affinity of carbon dioxide $CO_2$ for carbon C: a free energy of production of carbon monoxide CO, as a result of interaction of carbon dioxide $CO_2$ with carbon C at 1,000° K., is equal to $-19.55$ kcal/mol.

EXAMPLE 11

A plasma-forming mixture containing carbon monoxide CO (n=1) is introduced with a flow rate of 9,000 l/hr that corresponds to a second flow rate of carbon monoxide, reduced to an arc current of 500 amperes and equal to $5 \times 10^{-3}$ l/amp-sec, into an electric arc device into the space between the cathode of spectroscopically pure rod graphite pressed into a water-cooled copper cathode holder and the hollow water-cooled copper anode.

A DC arc of 500 amperes is struck between the cathode and the anode.

After a heat flow into the cathode has reached its maximum value, introduced into the space between the cathode and the anode is an oxidizing agent, that is oxygen, having a flow rate of 2,000 l/hr.

The increase of carbon monoxide content as compared to Example 10 is caused by the fact that oxygen is of greater chemical affinity for carbon than carbon dioxide.

A free energy of production of carbon monoxide CO, as a result of interaction of carbon with oxygen at 1,000° K., is equal to $-45.11$ kcal/mol.

EXAMPLE 12

A plasma-forming mixture containing propane $C_3H_8$ (n=3) is introduced with a flow rate 1,945 l/hr that corresponds to a propane flow rate reduced to an arc current of 600 amperes and equal to $(2.7 \times 10^{-3})/3$ l/amp-sec into an electric arc device between the cathode of spectroscopically pure graphite rod pressed into a water-cooled copper cathode holder and the hollow water-cooled copper anode.

An air conversion of propane proceeds according to the following reaction:

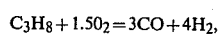

$$C_3H_8 + 1.5O_2 = 3CO + 4H_2,$$

i.e. theoretically complete conversion of propane having a flow rate of 1.945 l/hr requires approximately 2,920 l/hr of oxygen or 13,900 l/hr of air.

A DC arc of 600 amperes is struck between the cathode and the anode.

After a heat flow into the cathode has reached its maximum value, introduced into the space between the cathode and the anode is an oxidizing agent, that is air, having a flow rate of 9,730 l/hr which corresponds to 0.7 of the amount required for theoretically complete conversion of hydrocarbons.

EXAMPLE 13

A plasma-forming mixture containing methane $CH_4$(n=1) is introduced with a flow rate of 3,450 l/hr that corresponds to a second flow rate of methane, reduced to an arc current of 800 amperes and equal approximately to $1.2 \times 10^{-3}$ l/amp-sec, into an electric arc device into the space between the cathode of spectroscopically pure rod graphite pressed into a water-cooled copper cathode holder and the hollow water-cooled copper anode.

A DC arc of 800 amperes is struck between the cathode and the anode.

After a heat flow into the cathode has reached its maximum value, introduced into the space between the cathode and the anode is anoxidizing agent, that is a carbon dioxide, having a flow rate of 5,500 l/hr.

The decrease of the flow rate of a carbon-containing compound, that is methane, reduced to an arc current, as compared to Example 12 is possible due to the fact that carbon dioxide is less chemically active to hydrocarbons than oxygen and air.

EXAMPLE 14

A plasma-forming mixture containing a natural gas including 90 percent of methane $CH_4$ and argon is introduced with a flow rate of methane equal to 3,000 l/hr and that of argon equal to 1,000 l/hr into the space between the electrodes.

A DC arc of 600 amperes is struck between the face-ended cathode with a backing of spectroscopically pure graphite, positioned in a plasmatron, and the anode formed by the charge of carbon with calcium carbide disposed in a graphite crucible.

After a heat flow into the cathode has reached its maximum value, the supply of argon into the space between the electrodes is cut off, and an oxygen, that is air, is introduced therein with a flow rate of 3,600 l/hr that corresponds to 0.5 of the amount required for theoretically complete conversion of a natural gas having a flow rate of 3,000 l/hr according to the reaction (7):

$$CH_4 + 0.5O_2 = CO + 2H_2$$

Sixty seconds after a heat flow into the cathode has reached its steady value of 1.5 kw, the supply of air is cut off, 150 seconds after the cut-off of air supply, i.e. when the electric arc burns in the atmosphere of natural gas alone, a heat flow into the cathode starts to grow and reaches the value of 1.65 kw, i.e. 10 percent over the steady value, 200 seconds after the cut-off of air supply. At this instant the air is again introduced into the space between the electrodes in the amount of 3,600 l/hr. Thirty seconds after this, when a heat flow into the cathode drops to 1.5 kw, the air supply is again cut off.

Thus, periodically supplying the air into the plasma-forming mixture only for short periods of time compared to the time of arc burning in the atmosphere of a natural gas alone, the whole process of treatment is conducted. In so doing, the burning of the electric arc is stable, and the quality of the material produced in the course of melting is satisfactory.

Along with Examples mentioned hereinabove, when the oxidizing agent and carbon-containing compounds are introduced together into the zone of contact with the electrodes of the electrode gap of the arc device, their separate introduction is also possible.

The latter arises from the fact that carbon deposition on the electrodes exposed to different potentials, i.e. on the cathode and on the anode, is governed by different laws, and carry-over of the excessive carbon is caused by chemical interaction with substances active thereto as well as by its evaporation as a result of thermal action of the electric arc.

It is well known to those skilled in the art that one of the main components of a heat flow into the cathode, when a plasma-forming mixture contains polyatomic molecules, particularly diatomic ones, also including those of an oxidizing agent, is defined by the neutralization of positive ions on the cathode with the formation of atoms and their further uniting into molecules.

In so doing, released at the cathode is the energy of ionization and dissociation of these gases.

Schematically, this process proceeds as follows:

$$A^{30} + e^- \rightarrow A + Q_1 \qquad (11)$$

$$A + A \rightarrow A_2 + Q_2 \qquad (12),$$

where
$A^+$ is a positive gas ion,
A is a neutral gas ion,
$Q_1$ is a gas ionization energy,
$Q_2$ is a gas dissociation energy,
$e^-$ is an electron.

For nitrogen, the values of $Q_1$ and $Q_2$ are equal to 335 kcal/mol and 225 kcal/mol, respectively, and for oxygen, they are 313 kcal/mol and 118 kcal/mol respectively.

It has been experimentally found that, when an electric arc burns at high currents, the excessive carbon can be removed from a cathode, in some cases, only due to thermal action of an electric arc without special oxidizing agent supply into the zone of contact with the cathode, which is never observed for an anode.

Elimination of an oxidizing agent from a gaseous atmosphere contacting the cathode enables a heat flow into the cathode to be reduced due to elimination of the aforementioned energies of ionization and dissociation, released thereat, which in turn makes it possible to increase the operating life of a cathode, while the excessive carbon in the anode passage is removed by an oxidizing agent introduced in the electrode gap directly into the anode passage off the zone of contact with the operating surface of the cathode.

Carbon-containing compounds can be introduced into the electrode gap either in full, into the zone of contact with the operating surface of the cathode, or in part, into this zone and into the anode passage.

A device shown in FIG. 5 realizes a method of plasma treatment of primarily electrically non-conductive materials with a plasma jet produced in the course of arc burning between the electrodes of an electric arc device.

Introduced through the bushing 5 (FIG. 5) into the space 1 between the face-ended cathode 2 and the hollow anode 3 of the electric arc device connected to the DC power supply 4 is the plasma-forming mixture 6 including carbon-containing compounds in the form of hydrocarbons or carbon monoxide.

An arc is struck between the face-ended cathode 2 and the hollow anode 3.

A cooling liquid is supplied into the tube 7 disposed inside the cathode holder 8 and into the cooling chambers 9 and 14 of the hollow anode 3 and of the intermediate nozzle 12. An oxidizing agent 15 or its mixture with carbon-containing compounds is introduced into the space 1 between the electrodes 2 and 3 through passages in an intermediate bushing 16 disposed between the intermediate nozzle 12 and the hollow anode 3.

Thus, the oxidizing agent 15 is supplied off the zone of contact of the plasma-forming mixture 6 with the operating surface of the cathode 2 constantly restoring from this mixture.

This in turn makes it possible to perform differentiated control of the operating conditions of each electrode, the cathode 2 and the anode 3, functioning according to different polarities in different conditions.

EXAMPLE 15

A DC arc is struck between the face-ended cathode with a backing of spectroscopically pure graphite pressed into a water-cooled copper cathode holder and the hollow water-cooled copper anode, both being disposed in a plasmatron and separated by an intermediate nozzle.

An arc current is equal to 500 amperes.

Supplied into the zone of contact with the cathode is a plasma-forming mixture composed of a natural gas having a flow rate of 2,500 l/hr and argon having a flow rate of 1,000 l/hr.

Supplied into the zone of contact with the anode, i.e. outside the intermediate nozzle, is a plasma-forming mixture composed of a natural gas having a flow rate of 2,000 l/hr and air having a flow rate of 3,500 l/hr.

After a heat flow into the cathode has reached its maximum value, supplied into the zone of contact with the cathode is an oxidizing agent, that is air, having a flow rate of 3,750 l/hr which corresponds to 0.63 of the amount required for theoretically complete conversion of a natural gas having a flow rate 2,500 l/hr, and the supply of argon is cut off.

Sixty seconds after a heat flow into the cathode has reached its steady value of 1.8 kw, the flow rate of the air fed into the zone of contact with the operating surface of the cathode is reduced down to 1,250 l/hr that corresponds to 0.21 by volume of the amount required for theoretically complete conversion of a natural gas having a flow rate of 2,500 l/hr. 300 seconds after the flow rate of air has been decreased, a heat flow into the cathode starts to grow and after 100 seconds reaches 2.07 kw, i.e. 15 percent over the steady value. At this instant the flow rate of air in the plasma-forming mixture contacting the cathode is increased up to 3,750 l/hr. Thirty seconds after this, when a heat flow into the cathode drops down to 1.8 kw, the flow rate of the air fed into the zone of contact with the operating surface of the cathode is again reduced.

Thus, periodically varying the composition of a plasma-forming mixture in the zone of contact with the operating surface of the cathode and leaving the composition of a plasma-forming mixture unchanged in the zone of contact with the operating surface of the anode, which prevents the anode passage from coking up, conducted is the process of production of a reducing plasma jet further used to reduce sulphur dioxide from the off-gases of a cyclone melting of sulphide materials.

In so doing, the electric arc exhibits stable burning, the cathode being constantly restored.

From the specific examples of the embodiments of the present invention considered hereinabove, it is readily apparent to those skilled in the art that all the objects of the invention can be accomplished within the scope of the appended claims. But it is also readily apparent that insignificant changes in the operations of the method can be made without departing from the spirit of the invention. All these changes are considered to be within the spirit and scope of the invention as defined in the claims below.

The proposed method of plasma treatment of materials provides constant restoration of the electrodes of an electric arc device from a plasma-forming mixture, which in turn makes it possible to conduct continuous processes of plasma treatment, primarily metallurgical ones, without cutting off an electric arc and stopping the process to replace the electrodes. As a result, the cost price of plasma treatment is decreased and its quality is improved, as well as reduced is the expenditure of costly materials of which the electrodes are fabricated, such as tungsten, molybdenum, hafnium, zirconium, as they are replaced with an inexpensive graphite.

The possibility of using plasma-forming mixtures also containing carbon dioxide along with hydrocarbons or carbon monoxide enables plasma welding of constructional steels in the atmosphere of carbon dioxide, which is one of the most widespread kinds of plasma treatment, to be included into a variety of processes conducted with constant restoration of electrodes.

The use of the off-gases of chemical-metallurgical production, containing carbon monoxide, oxygen, carbon dioxide, and steam for plasma formation, on the one hand, increases the economic efficiency of treatment due to the costless of said gases, and on the other hand, improves protection of the environment by preventing exhaust of carbon monoxide entering into said gases into the environment, which monoxide is further utilized.

What is claimed is:

1. A method for plasma treatment of materials comprising:
   introducing a first flow of a plasma-forming gas mixture including carbon-containing compounds selected from hydrocarbons in the amount of from $(0.5 \times 10^{-3})/n$ l/amp-sec to $(6 \times 10^{-3})/n$ l/amp-sec, into the space between the electrodes of an electric arc device to provide deposition of carbon at least on one of the electrodes of the electric arc device in the course of arc burning, where "n" is a number of atoms of carbon in the employed carbon-containing compound, said amount depending on the chemical affinity of an oxidizing agent for said carbon-containing compound;
   striking an electric arc;
   measuring a quantity of heat flowing into one of said electrodes upon which carbon is deposited;
   detecting a peak in said quantity of heat;
   adding a second flow of an oxidizing agent to said first flow beginning at said peak;
   substantially reducing said second flow when said heat flow drops down to a steady value, whereby stable and reliable arc burning is provided.

2. A method according to claim 1 wherein oxidizing agent introduced into the space between the electrodes, is in the form of oxygen and is supplied in the amount from 0.4 to 0.9 by volume of that corresponding to theoretically complete conversion of hydrocarbons.

3. A method according to claim 1 wherein oxidizing agent introduced into the space between the electrodes is in the form of air and is supplied in the amount from 0.4 to 0.9 by volume of that corresponding to theoretically complete conversion of hydrocarbons.

4. A method according to claim 1 wherein, after the heat flow into the electrode has reached its steady value, the oxidizing agent in the form of oxygen is introduced into the space between the electrodes in the amount less than 0.4 by volume of that corresponding to theoretically complete conversion of hydrocarbons.

5. A method according to claim 1 wherein, after the heat flow into the electrode has reached its steady value, the oxidizing agent in the form of air is introduced into the space between the electrodes in the amount less than 0.4 by volume of that corresponding to theoretically complete conversion of hydrocarbons.

6. A method of plasma treatment of materials comprising:
   introducing a first flow of a plasma-forming gas mixture including carbon-containing compounds selected from hydrocarbons into the space between the electrodes of an electric arc device to provide deposition of carbon at least on one of the electrodes of the electric arc device in the course of arc burning;
   striking an electric arc;
   measuring a quantity of heat flowing into one of said electrodes upon which carbon is deposited;
   detecting a peak in said quantity of heat;
   adding a second flow of an oxidizing agent to said first flow beginning at said peak; and substantially reducing said second flow when said heat flow drops down to a steady value, whereby stable and reliable arc burning is provided.

7. The method according to claim 6 wherein tthe oxidizing agent introduced into the space between the electrodes is in the form of carbon dioxide and is supplied beginning at said peak in an amount from 1.05 to 2.5 times by volume more than that corresponding to a theoretically complete conversion of the hydrocarbons.

8. A method according to claim 6 wherein, after the heat flow into the electrode has reached its steady value, the oxidizing agent in the form of carbon dioxide is introduced into the space between the electrodes in the amount less than 1.05 by volume of that corresponding to theoretically complete conversion of hydrocarbons.

9. A method according to claim 6 wherein the oxidizing agent and the plasma-forming mixture including carbon-containing compounds are introduced into the space between the electrodes separately, carbon-containing compounds being introduced directly into the zone contacting the operating surface of one of the electrodes.

10. A method of plasma treatment of materials comprising:
introducing a first flow of a plasma-forming gas mixture including carbon-containing compounds in the form of carbon monoxide into the space between the electrodes of an electric arc device to provide deposition of carbon at least on one of the electrodes of the electric arc device in the course of arc burning;
striking an electric arc;
measuring a quantity of heat flowing into one of said electrodes upon which carbon is deposited;
detecting a peak in said quantity of heat;
adding a second flow of an oxidizing agent to said first flow beginning at said peak;
substantially reducing said second flow when said heat flow drops down to a steady value, whereby stable and reliable arc burning is provided.

11. The method according to claim 10 wherein the carbon-containing compound is introduced into the space between the electrodes in an amount from $(0.5 \times 10^{-3})/n$ l/amp-sec to $(6 \times 10^{-3})/n$ l/amp-sec, where "n" is the number of atoms of carbon in the carbon-containing compound, said amount depending on the chemical affinity of said oxidizing agent for said carbon-containing compound.

12. A method according to claim 10 wherein the oxidizing agent and the plasma-forming mixture including carbon-containing compounds are introduced into the space between the electrodes separately, carbon-containing compounds being introduced directly into the zone contacting the operating surface of one of the electrodes.

13. A method according to claim 1, 6 or 10 further comprising detecting an increase of said heat flow a predetermined amount above said steady value, adding said second flow until said heat flow drops down to said steady value, and again substantially reducing said second flow.

14. A method according to claim 13 wherein the step of reducing said second flow includes stopping said second flow.

15. The method according to claim 1 wherein a carbon-containing compound is introduced into the space between the electrodes in the amount from $(0.5 \times 10^{-3})/n$ l/amp-sec to $(6 \times 10^{-3})/n$ l/amp-sec, where "n" is a number of atoms of carbon in the employed carbon-containing compound, said amount depending on the chemical affinity of said oxidizing agent for said carbon-containing compound.

* * * * *